(12) United States Patent
Hu et al.

(10) Patent No.: US 11,604,039 B2
(45) Date of Patent: Mar. 14, 2023

(54) PASSIVE PULSE WATER FLOW ADJUSTMENT DEVICE FOR WATER FLOW COOLING

(71) Applicant: Shanghai Jiao Tong University, Shanghai (CN)

(72) Inventors: Po Hu, Shanghai (CN); Shuwei Zhai, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 17/630,531

(22) PCT Filed: Apr. 13, 2021

(86) PCT No.: PCT/CN2021/086810
§ 371 (c)(1),
(2) Date: Jan. 27, 2022

(87) PCT Pub. No.: WO2021/253947
PCT Pub. Date: Dec. 23, 2021

(65) Prior Publication Data
US 2022/0244003 A1    Aug. 4, 2022

(30) Foreign Application Priority Data
Jun. 18, 2020 (CN) .......................... 202010559793.6

(51) Int. Cl.
*F28F 25/02*    (2006.01)
*F28D 21/00*    (2006.01)

(52) U.S. Cl.
CPC .............. *F28F 25/02* (2013.01); *F28D 21/00* (2013.01); *F28D 2021/0054* (2013.01)

(58) Field of Classification Search
CPC .... F28F 25/02; F28F 25/04; F28F 5/00; F28F 13/10; F28F 13/04; F28D 21/00;
(Continued)

(56) References Cited

U.S. PATENT DOCUMENTS

| 221,067 | A | * | 10/1879 | Houston | .................. | A47J 31/54 |
|---|---|---|---|---|---|---|
| | | | | | | 137/134 |
| 354,624 | A | * | 12/1886 | Boyle | ..................... | A47J 31/54 |
| | | | | | | 137/215 |

(Continued)

FOREIGN PATENT DOCUMENTS

| CN | 105788670 | 7/2016 |
|---|---|---|
| CN | 106158056 | 11/2016 |

(Continued)

OTHER PUBLICATIONS

"International Search Report (Form PCT/ISA/210) of PCT/CN2021/086810," dated Jul. 12, 2021, with English translation thereof, pp. 1-4.

*Primary Examiner* — Travis Ruby
(74) *Attorney, Agent, or Firm* — JCIPRNET

(57) ABSTRACT

The present invention relates to a passive pulse water flow adjustment device for water flow cooling. The device includes a water storage container and a pulse water flow adjustment structure, wherein the water storage container is arranged in front of a to-be-cooled high-temperature wall surface through the pulse water flow adjustment structure, and the pulse water flow adjustment structure provides a non-continuous pouring pulse water flow for the high-temperature wall surface. This device is used to cool the high-temperature wall surface, and when being cooled, the high-temperature wall surface is poured by the pulse water flow.

7 Claims, 4 Drawing Sheets

(58) Field of Classification Search
CPC .. F28D 2021/0054; F28D 11/06; F15D 1/006; F15D 1/002; Y02E 30/30
See application file for complete search history.

(56) References Cited

U.S. PATENT DOCUMENTS

| | | | | |
|---|---|---|---|---|
| 948,880 | A * | 2/1910 | Mefford | F24F 5/0035 62/304 |
| 1,291,926 | A * | 1/1919 | Kleucker | B05B 1/044 239/193 |
| 4,107,796 | A * | 8/1978 | Nafziger | E03D 1/20 4/353 |
| 4,385,010 | A * | 5/1983 | Bosne | F28F 25/04 261/DIG. 85 |
| 5,226,935 | A * | 7/1993 | Wolff | F24F 6/04 96/240 |
| 5,666,674 | A * | 9/1997 | Hennessy | E03D 1/20 4/353 |
| 8,201,282 | B2 * | 6/2012 | Wilson | E03D 13/00 4/310 |
| 8,522,371 | B2 * | 9/2013 | Bevan | E03D 1/20 4/363 |
| 9,187,889 | B2 * | 11/2015 | Juhere | E03F 5/107 |
| 2019/0078815 | A1 | 3/2019 | Hongo et al. | |

FOREIGN PATENT DOCUMENTS

| | | |
|---|---|---|
| CN | 108759513 | 11/2018 |
| CN | 111750724 | 10/2020 |
| FR | 2843074 | 2/2004 |
| FR | 3088418 | 5/2020 |
| GB | 2497947 | 7/2013 |
| KR | 20150002581 | 1/2015 |
| KR | 101619075 | 5/2016 |
| WO | 2019014226 | 1/2019 |

* cited by examiner

PASSIVE PULSE WATER FLOW ADJUSTMENT DEVICE FOR WATER FLOW COOLING

CROSS-REFERENCE TO RELATED APPLICATION

This application is a 371 of international application of PCT application serial no. PCT/CN2021/086810, filed on Apr. 13, 2021, which claims the priority benefit of China application no. 202010559793.6, filed on Jun. 18, 2020. The entirety of each of the above-mentioned patent applications is hereby incorporated by reference herein and made a part of this specification.

FIELD OF TECHNOLOGY

The present invention relates to the technical field of water flow cooling, in particular to a passive pulse water flow adjustment device for water flow cooling.

BACKGROUND

When a coolant loss accident or a main steam pipeline rupture occurs in a pressurized water reactor nuclear power plant, water vapor content inside the containment increases rapidly, resulting in a substantial increase in internal pressure and temperature. After the pressure and temperature rise to a setting value for opening an isolation valve at the bottom of a cooling water storage tank, cooling water flows out of the cooling water storage tank at the top of the containment under the action of gravity, flows through a water film distribution device, and forms a uniformly distributed falling film flow on the outer surface of the containment wall, wherein the flow rate of the water film is controlled by the liquid level of the cooling water storage tank. During the flow of the water film along the outer surface of the containment wall, a large amount of surface evaporation heat exchange occurs through the convection of the air flow on the surface of the water film. At the same time, the temperature of the water film continues to increase in the direction of the flow, resulting in a single phase convection heat exchange. These two dominant heat exchange modes take away the heat accumulated in the containment, and keep the temperature and pressure in the containment at a safe level.

Since the evaporation heat exchange efficiency of the water film is stronger than single phase convection heat exchange efficiency, under a same heat exchange demand, increasing the proportion of the water film evaporation heat in the total heat will effectively reduce the required total water film flow, and the volume of the cooling water storage tank is reduced. Therefore, it is urgent to design a water flow adjustment device that can increase the proportion of the water film evaporation heat exchange.

SUMMARY

The purpose of the present invention is to overcome the above-mentioned defects in the prior art and provide a passive pulse water flow adjustment device for water flow cooling that can increase the proportion of water film evaporation heat exchange.

The purpose of the present invention can be achieved through the following technical solutions:

A passive pulse water flow adjustment device for water flow cooling, the device comprising a water storage container and further comprising a pulse water flow adjustment structure, the water storage container is arranged in front of a to-be-cooled high-temperature wall surface through the pulse water flow adjustment structure, and the pulse water flow adjustment structure provides a non-continuous pouring pulse water flow for the high-temperature wall surface; the device is used to cool the high-temperature wall surface, and when being cooled, the high-temperature wall surface is poured by the pulse water flow.

Preferably, the pulse water flow adjustment structure comprises a base, and an opening at the front end of the water storage container forms a water outlet, the water storage container is provided with installation nodes disposed symmetrically on both sides, and the water storage container is reversibly installed on the base through the installation nodes, the base is provided with a first limiting member and a second limiting member for limiting a counterclockwise turning angle and a clockwise turning angle of the water storage container;

in an initial state, the water storage container is empty, the overall center of gravity of the water storage container is located behind the installation nodes far away from the water outlet, the water storage container is turned counterclockwise until the first limiting member, the water outlet faces upwards, after water flows into the water storage container from the water outlet, the overall center of gravity of the water storage container moves toward the direction of the water outlet, and the water storage container is turned clockwise to the second limiting member, after the water flows out, and the water storage container is turned to the initial state.

Preferably, the device further comprises a drainage structure, and the drainage structure is fixed on the base and is located below the water outlet of the water storage container.

Preferably, the base comprises two symmetrical triangular shaped brackets, and the tops of the triangular shaped brackets are respectively provided with an assembly groove for installing the installation nodes, and the installation nodes is rotatably connected with the assembly groove.

Preferably, the first limiting member and the second limiting member are arranged in parallel and the two ends thereof are respectively connected with two triangular shaped brackets, the first limiting member and the second limiting member are both located below the water storage container, and the first limiting member is close to the back end of the water storage container, the second limiting member is close to the front end of the water storage container.

Preferably, an installation height of the first limiting member in the vertical direction is lower than that of the second limiting member in the vertical direction.

Preferably, the first limiting member and the second limiting member are both rod-shaped.

Preferably, the water outlet is an inclined cut.

Preferably, the bottom of the water outlet is provided with a downward curved arc-shaped flow guide edge.

Preferably, the drainage structure comprises a support frame and a drainage plate, and the drainage plate is a circular arc groove shape, the notch thereof is upward and located below the water outlet of the water storage container, and one end of the drainage plate is fixed on the base through the support frame, and the other end forms a vertical drainage edge.

Preferably, the drainage structure is used on a condition where the high temperature wall surface to be cooled is a vertical wall surface, and the vertical drainage edge is close to the high-temperature wall surface to be cooled.

Compared with the prior art, the present invention has the following advantages:

(1) The passive pulse water flow adjustment device for water flow cooling in the present invention provides a pulse water cooling manner, so that a water film evaporation heat exchange ratio can be improved, and under the same heat exchange requirement, the required total water film flow is effectively reduced, and the volume of a cooling water storage tank is reduced;

(2) The pulse water flow adjustment structure in the present invention realizes the pulse water flow by turning the water storage container, and the continuous water flow is changed to the pulse water flow. When the water film flow rate is 0, the temperature of the wall surface to be cooled temporarily increases, and then the water film flows down to take away the heat. And then the water flow stops, and repeat the process again and again. In this mode, a higher wall surface temperature increases the temperature of the water film, resulting in a higher evaporation rate of the water film, and achieving the purpose of increasing the ratio of the evaporation heat exchange to total heat exchange in the water film. Furthermore, under the same heat exchange demand, the required total water film flow is effectively reduced, and the volume of the cooling water storage tank is reduced. The structure is reliable and is convenient to be implemented;

(3) The present invention realizes automatic turning through the action of gravity of the water storage container, does not require power to drive, and realizes energy saving;

(4) The bottom of the water outlet in the present invention is provided with the arc-shaped flow guide edge, which effectively prevents water splashing which causes waste;

(5) The present invention is provided with the drainage structure for the vertical wall surface condition, and the drainage plate keeps the water in a state of sticking to the wall, ensures that the lower wall surface is always covered by the water film, and improves the cooling effect.

In the figures, 1 is a water storage container, 2 is a base, 3 is a water outlet, 4 are installation nodes, 5 is a first limiting member, 6 is a second limiting member, 7 is an assembly groove, 8 is an arc-shaped flow guide edge, 9 is a support frame, 10 is a drainage plate, and 11 is a vertical wall surface.

DESCRIPTION OF THE EMBODIMENTS

The present invention is described in detail below with reference to the accompanying drawings and specific embodiments. Note that the description of the following implementations is merely an example in nature, and the present invention is not intended to limit its application or its use, and the present invention is not limited to the following implementations.

Embodiment 1

Figure 1:
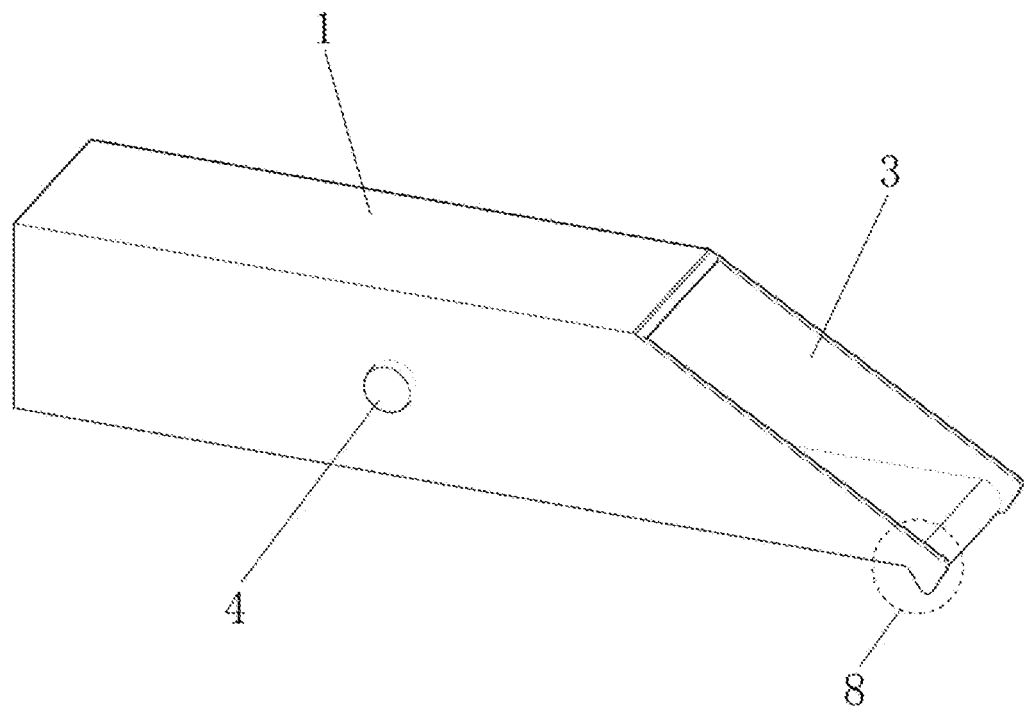
FIG. 1 is a structural schematic diagram of a water storage container in the present invention.
Figure 2:
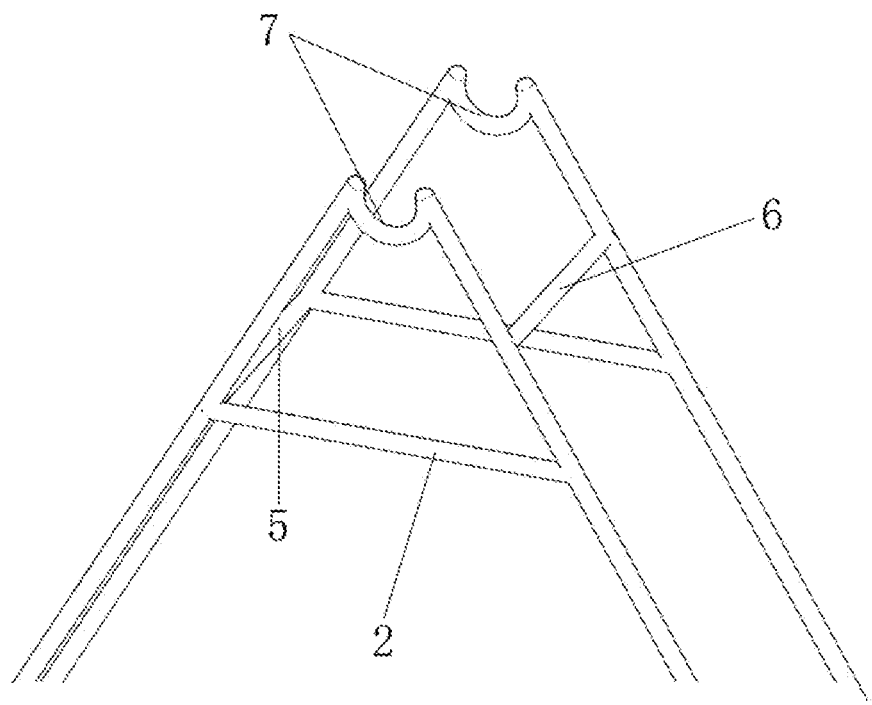
FIG. 2 is a structural schematic diagram of a base in the present invention.
Figure 3:
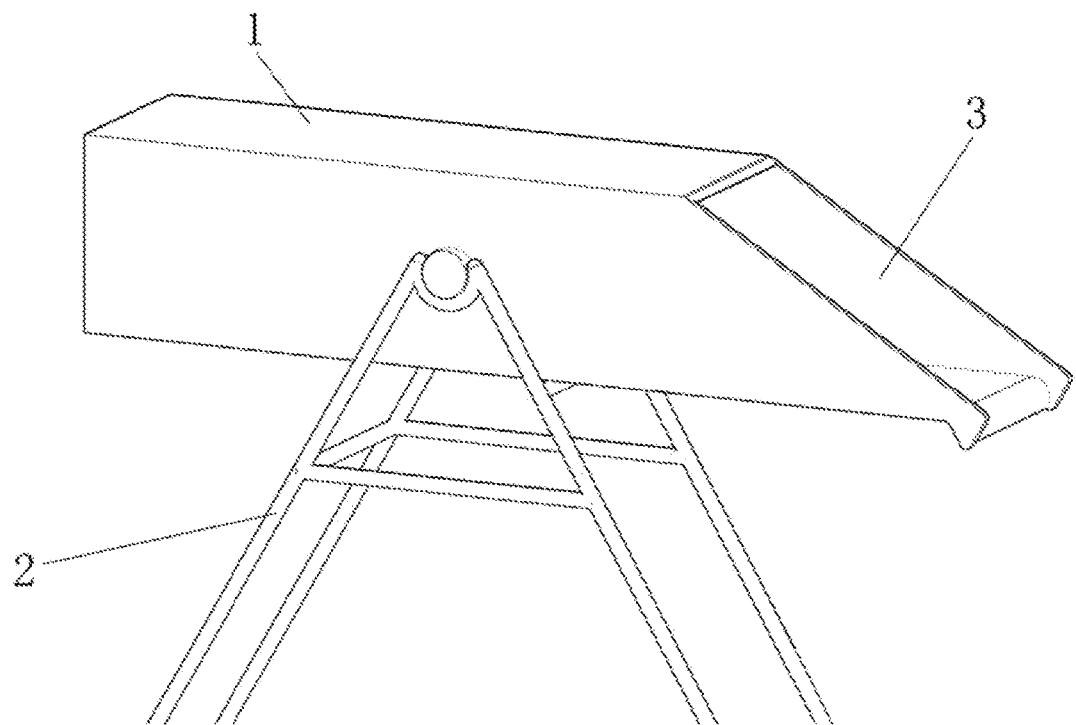
FIG. 3 is an installation schematic diagram of the water storage container and the base in the present invention.

As shown in FIG. 1 to FIG. 3, provided is a passive pulse water flow adjustment device for water flow cooling. The device comprises a water storage container 1 and a pulse water flow adjustment structure, wherein the water storage container 1 is arranged in front of a to-be-cooled high-temperature wall surface through the pulse water flow adjustment structure, and the pulse water flow adjustment structure provides a non-continuous pouring pulse water flow for the high-temperature wall surface. This device is used to cool the high-temperature wall surface, and when being cooled, the high-temperature wall surface is poured by the pulse water flow. The passive pulse water flow adjustment device for water flow cooling in the present invention is separately arranged under each water outlet of a water film distribution device, which can adjust a continuous water flow into the pulse water flow. The device provides a pulse water cooling manner, so that the ratio of the water film evaporation heat exchange to the total heat exchange can be improved, and under the same heat exchange requirement, the total water film flow is effectively reduced, and the volume of a cooling water storage tank is reduced.

Among them, the pulse water flow adjustment structure comprises a base 2, and an opening at the front end of the water storage container 1 forms a water outlet 3, the water storage container 1 is provided with installation nodes 4 disposed symmetrically on both sides, and the water storage container 1 is reversibly installed on the base 2 through the installation nodes 4, the base 2 is provided with a first limiting member 5 and a second limiting member 6 for limiting a counterclockwise turning angle and a clockwise turning angle of the water storage container 1.

Specifically, the base 2 in this embodiment comprises two symmetrical triangular shaped brackets, and the tops of the triangular shaped brackets are respectively provided with an assembly groove 7 for installing the installation nodes 4, and the installation nodes 4 is rotatably connected with the assembly groove 7.

The first limiting member 5 and the second limiting member 6 are arranged in parallel and the two ends thereof are respectively connected with two triangular shaped brackets, the first limiting member 5 and the second limiting member 6 are both located below the water storage container 1, and the first limiting member 5 is close to the back end of the water storage container 1, the second limiting member 6 is close to the front end of the water storage container 1. An installation height of the first limiting member 5 in the vertical direction is lower than that of the second limiting member 6 in the vertical direction, the first limiting member 5 and the second limiting member 6 are both rod-shaped.

In this embodiment, the water storage container 1 is a rectangular parallelepiped, with one end thereof being closed, and the other end being open to form a water outlet 3. The water outlet 3 is an inclined cut. The water outlet 3 in this embodiment is a rectangle inclined cut, so that the entire water storage container is in the shape of a right-angled trapezoid. The bottom of the water outlet 3 is provided with a downward curved arc-shaped flow guide edge 8. The arc-shaped flow guide edge 8 can effectively prevent water splashing which causes waste.

Figure 4:
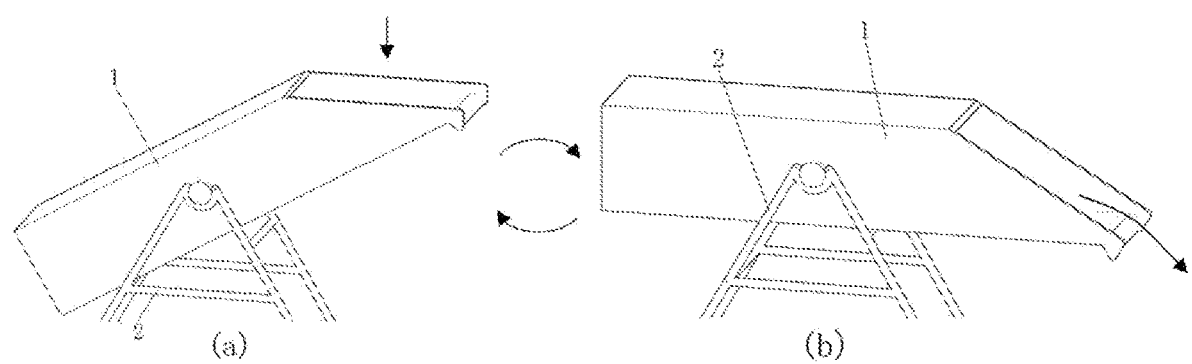
FIG. 4 is a schematic diagram of an operating state of a passive pulse water flow adjustment device in the present invention.

As shown in FIG. 4, the operation process of the passive pulse water flow adjustment device in the present invention is specifically as follows:

1. In an initial state, the water storage container 1 is empty, the overall center of gravity of the water storage container 1 is located behind the installation nodes 4 far away from the water outlet 3, the water storage container is turned counterclockwise until the first limiting member 5 and the water outlet 3 faces upwards;

2. Water flows into the water storage container from the water outlet 3. During a water storage process, the overall center of gravity of the water storage container moves toward the direction of the water outlet 3;

3. When the overall center of gravity of the water storage container moves to a position near the water outlet 3 in front of the installation nodes 4, the water storage container 1 is turned clockwise under the action of gravity until the second limit member 6, and the water flows out;

4. After the water flows out, the overall center of gravity of the water storage container moves again, and the water storage container is turned to the initial state.

The pulse water flow adjustment device in the present invention realizes the pulse water flow by turning the water storage container, and the continuous water flow is changed to the pulse water flow. When the water film flow rate is 0, the temperature of the wall surface to be cooled temporarily increases, and then the water film flows down to take away the heat. And then the water flow stops, and repeat the process again and again. In this mode, a higher wall surface temperature increases the temperature of the water film, resulting in a higher evaporation rate of the water film, and achieving the purpose of increasing the ratio of the evaporation heat exchange to the total heat exchange in the water film. Furthermore, under the same heat exchange demand, the required total water film flow is effectively reduced, and the volume of the cooling water storage tank is reduced. The water flow adjustment device in this embodiment is more suitable for a non-vertical wall surface. Even if the water storage container 1 is stuck and unable to move due to extreme conditions such as rust, vibration, the water flow can continue to flow down from the water outlet 3 after the water in the water storage container 1 is full. Since the wall surface is the non-vertical wall surface, the water flows along the wall surface and does not fall directly, thus not affecting cooling.

Embodiment 2

Figure 5:
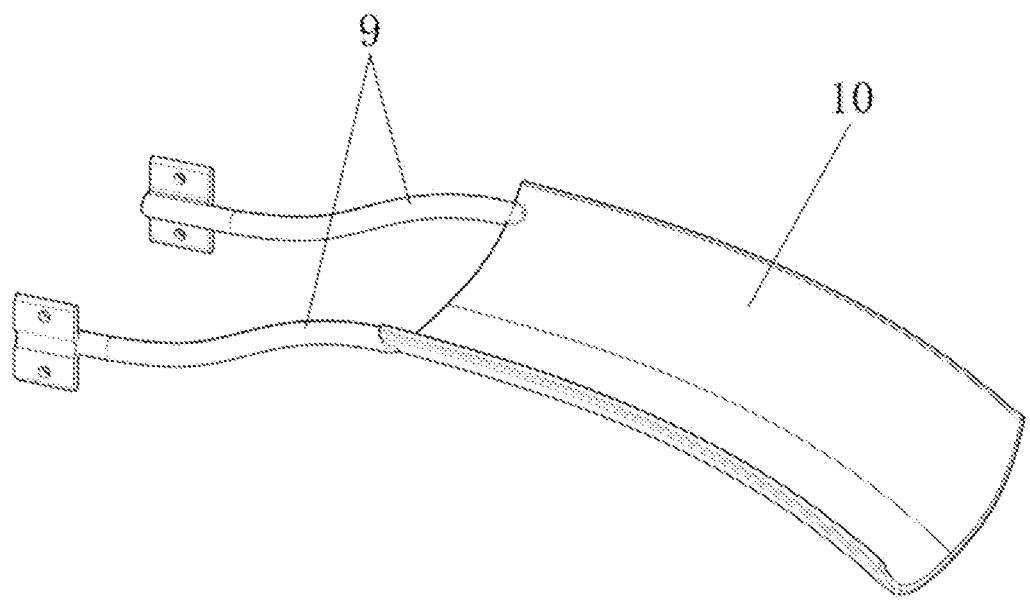
FIG. 5 is a structural schematic diagram of a drainage structure in the present invention.
Figure 6:
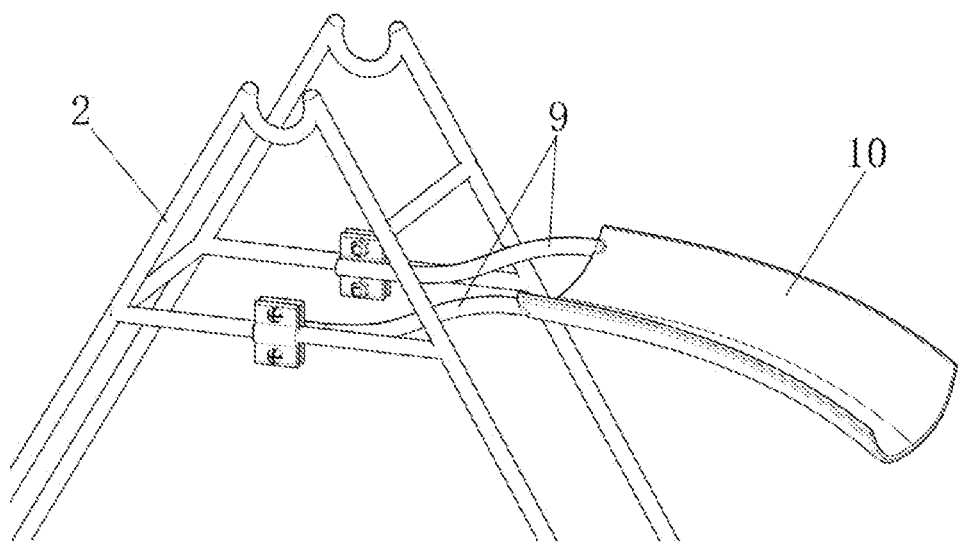
FIG. 6 is an installation schematic diagram of the drainage structure and the base in the present invention.
Figure 7:
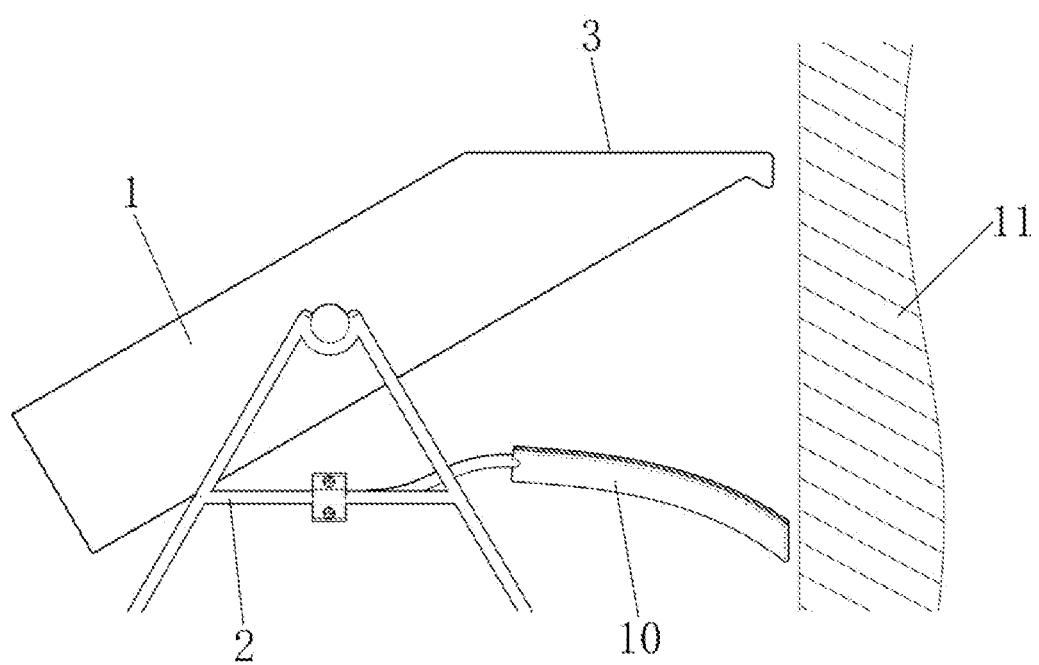
FIG. 7 is an installation schematic diagram of a passive pulse water flow adjustment device under a vertical wall surface condition in the present invention.

As shown in FIG. 5 to FIG. 7, on the basis of embodiment 1, the passive pulse water flow adjustment device for water flow cooling in the present embodiment further comprises a drainage structure, and the drainage structure is fixed on the base 2 and is located below the water outlet 3 of the water storage container 1. The drainage structure comprises a support frame 9 and a drainage plate 10, and the drainage plate 10 is a circular arc groove shape, the notch thereof is upward and located below the water outlet 3 of the water storage container 1, and one end of the drainage plate 10 is fixed on the base 2 through the support frame 9, and the other end forms a vertical drainage edge. The device in this embodiment is more suitable for use under a vertical wall surface condition. When being in use, the vertical drainage edge is close to a vertical wall surface 11, and the drainage plate 10 keeps the water in a state of sticking to the wall. If the water storage container 1 is stuck and unable to move due to extreme conditions such as rust, vibration, the water flow can continue to flow down from the water outlet 3 after the water in the water storage container 1 is full. The drainage plate 10 keeps the water in a state of sticking to the wall, ensures that the lower wall surface is always covered by the water film, prevents the water flow from directly falling off the plate, and ensures the reliable operation of the device.

The foregoing implementations are only examples, and do not limit the scope of the present invention. These implementations can be implemented in other various ways, and various omissions, substitutions, and changes can be made without departing from the scope of the technical idea of the present invention.

What is claimed is:

1. A passive pulse water flow adjustment device for water flow cooling, the device comprising a water storage container and a pulse water flow adjustment structure, wherein the water storage container is arranged in front of a high-temperature wall surface to be cooled through the pulse water flow adjustment structure, and the pulse water flow adjustment structure provides a non-continuous pouring pulse water flow for the high-temperature wall surface;

the device is configured to cool the high-temperature wall surface, and when being cooled, the high-temperature wall surface is poured by the pulse water flow;

the pulse water flow adjustment structure comprises a base, and an opening at the front end of the water storage container forms a water outlet, the water storage container is provided with installation nodes disposed symmetrically on both sides, and the water storage container is reversibly installed on the base through the installation nodes, the base is provided with a first limiting rod and a second limiting rod for limiting a counterclockwise turning angle and a clockwise turning angle of the water storage container; and in an initial state, the water storage container is empty, the overall center of gravity of the water storage container is located behind the installation nodes far away from the water outlet, the water storage container is turned counterclockwise until the first limiting rod, the water outlet faces upwards, after water flows into the water storage container from the water outlet, the overall center of gravity of the water storage container moves in a direction toward the water outlet, and the water storage container is turned clockwise to the second limiting rod, the water flows out, and the water storage container is turned to the initial state, wherein the base comprises two symmetrical triangular shaped brackets, and the tops of the triangular shaped brackets are respectively provided with an assembly groove for installing the installation nodes, and the installation nodes is rotatably connected with the assembly groove, wherein the first limiting rod and the second limiting rod are arranged in parallel and the two ends thereof are respectively connected with the two triangular shaped brackets, the first limiting rod and the second limiting rod are both located below the water storage container, and the first limiting rod is close to the back end of the water storage container, the second limiting rod is close to the front end of the water storage container.

2. The passive pulse water flow adjustment device for water flow cooling according to claim 1, wherein the device further comprises a drainage structure, and the drainage structure is fixed on the base and is located below the water outlet of the water storage container, wherein the drainage structure comprises a support frame and a drainage plate.

3. The passive pulse water flow adjustment device for water flow cooling according to claim 1, wherein an installation height of the first limiting rod in the vertical direction is lower than that of the second limiting rod in the vertical direction, the first limiting rod and the second limiting rod are both rod-shaped.

4. The passive pulse water flow adjustment device for water flow cooling according to claim 1, wherein the water outlet is an inclined cut.

5. The passive pulse water flow adjustment device for water flow cooling according to claim 4, wherein the bottom of the water outlet is provided with a downward curved arc-shaped flow guide edge.

6. The passive pulse water flow adjustment device for water flow cooling according to claim 2, wherein the drainage plate is a circular arc groove shape, a groove opening of the drainage plate is upwardly opened and located below the water outlet of the water storage container, and one end of the drainage plate is fixed on the base through the support frame, and the other end forms a vertical drainage edge.

7. The passive pulse water flow adjustment device for water flow cooling according to claim 6, wherein the drainage structure is configured for a condition where the high temperature wall surface to be cooled is a vertical wall surface, and the vertical drainage edge is close to the high-temperature wall surface to be cooled.

\* \* \* \* \*